Jan. 2, 1951      A. P. HULTGREN      2,536,181
INSULATED CONTROL SHAFT FOR VARIABLE RESISTORS
Filed March 18, 1949
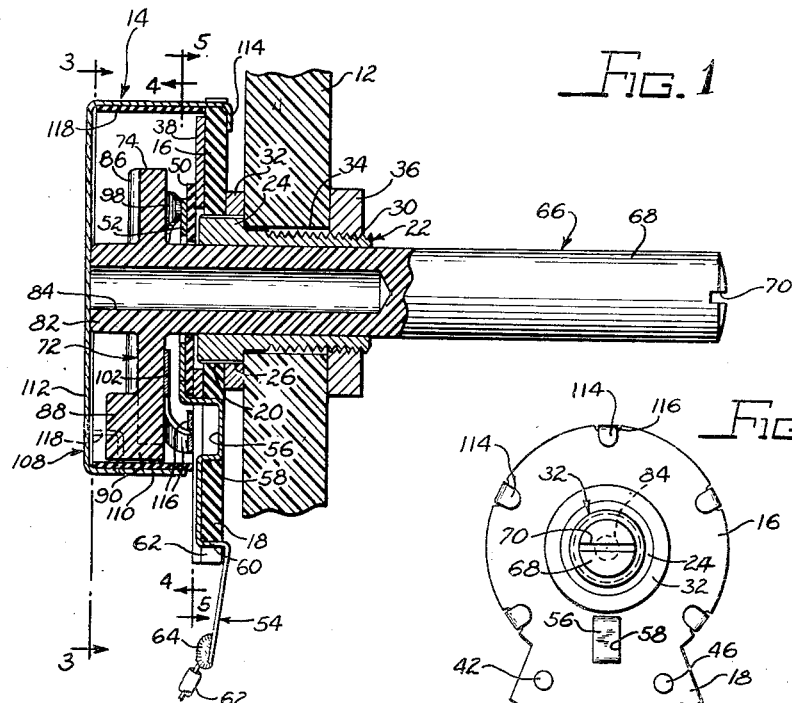
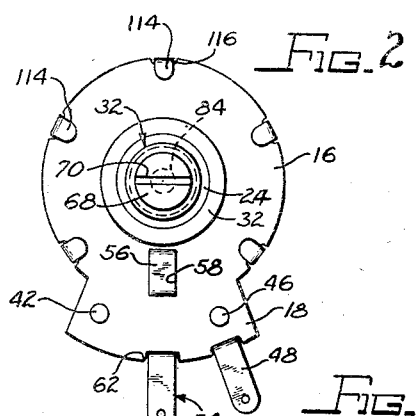
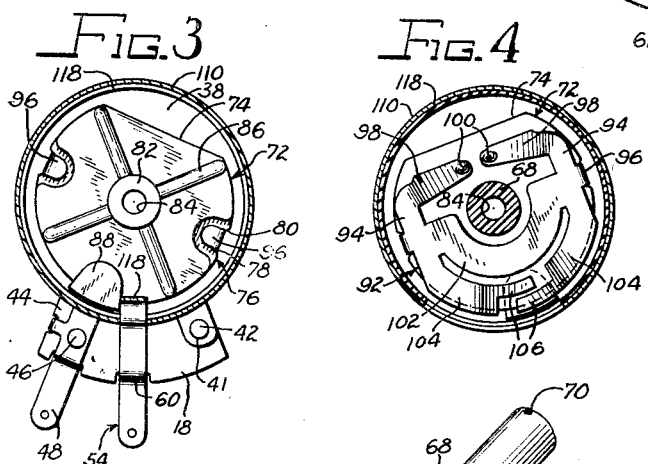
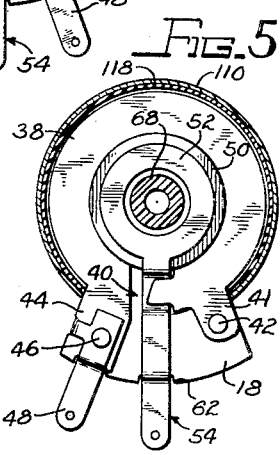
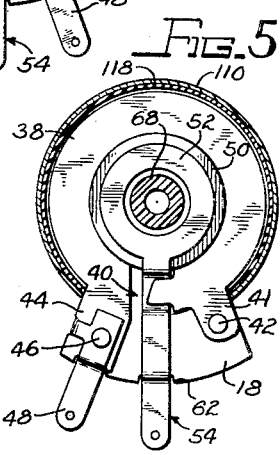
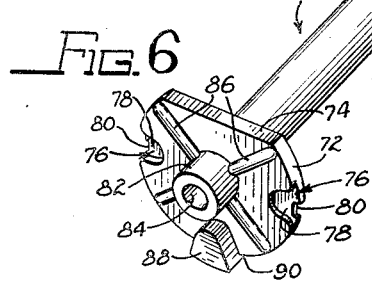
INVENTOR.
Arnold P. Hultgren
BY Baird & Freeman
Attys.

Patented Jan. 2, 1951

2,536,181

UNITED STATES PATENT OFFICE 2,536,181

INSULATED CONTROL SHAFT FOR VARIABLE RESISTORS

Arnold P. Hultgren, River Forest, Ill., assignor to American Molded Products Co., Chicago, Ill., a corporation of Illinois Application March 18, 1949, Serial No. 82,174

2 Claims. (Cl. 201—55)

This invention relates to electrical control devices and more particularly to a control shaft which constitutes a part of such devices.

The control devices to which the present invention is directed, has particular applicability in the radio and television fields, and other allied fields, and such devices may be in the form of switches or rheostats for controlling electrical circuits.

In devices of this general nature heretofore known, there has been an element of danger present, particularly in the television field. Certain circuit control devices and similar appliances are connected in high voltage lines, and if a person did not exercise extreme care in working with them, there is great danger of shock and injury.

Such appliances are usually provided with a control shaft; previously such shafts have been made of metal presenting great possibilities of electrical shock to repairmen. It was necessary to take such measures as utilizing insulation material in association with the metal shafts so that the worker would not be exposed to the high voltage in the appliance.

Constructions involving interposition of insulation material in metal shafts are costly to manufacture, and their effectiveness is not all that is to be desired.

It is therefore an object of the present invention to provide a novel control shaft which overcomes the objections above referred to.

Another object is the provision of a control shaft for use in a circuit control device, which is of plastic material of dielectric characteristics, molded as a unitary article, and which is provided with certain shapes and configurations cooperable with elements of the control device for operating the latter.

Still another object of the invention is the provision of a control shaft, which by reason of its being molded of plastic material, is formed with certain configurations for cooperation with the housing in which it is mounted for retaining the shaft in proper position, which were not feasible with constructions heretofore known.

A further object is the provision of a control shaft molded as a unitary article, in which the material is such as to form effective bearing material, by reason of which the article can be formed with certain configurations for coaction with other features of the control device and for more effectively mounting the shaft in an enclosing housing.

A still further object is the provision of a control shaft which is more economical to manufacture, and in the assembly thereof in a control device, than devices heretofore known.

With these and other objects in view, my invention consists in the construction, arrangement and combination of the various elements of my device whereby the objects contemplated are attained, as hereinafter more fully set forth, pointed out in my claims and illustrated in the accompanying drawings, wherein:

Figure 1 is an axial sectional view of an electrical control device embodying the present invention.

Figure 2 is a reduced scale view from the right of Figure 1 but with the supporting panel removed.

Figure 3 is a reduced scale view taken on line 3—3 of Figure 1.

Figure 4 is a reduced scale view taken on line 4—4 of Figure 1.

Figure 5 is a reduced scale view taken on 5—5 of Figure 1; and

Figure 6 is a perspective view of the control shaft embodying the present invention.

Referring now in detail to the drawings, the numeral 12 refers to a panel which may form part of a radio cabinet or television set or similar appliance and in which control elements are ordinarily mounted.

The appliance in which the control shaft of the present invention is employed will be termed herein a circuit control device, and in the present instance, the control device is in the nature of a rheostat. However, it will be understood that the control shaft can be effectively employed in switches, and other appliances as well, as will be readily apparent from the following description. The control device is indicated as a whole at 14 and includes a rigid mounting plate 16, adapted to support certain other elements as will be referred to later. The mounting plate 16 is preferably of pressed fiber board and is of course of electrical insulation material. The mounting plate 16 is provided with a fan tail shape radial extension 18 on one side thereof, and a central opening 20. The means for mounting the mounting plate 16 includes a tubular bearing member 22 having an enlarged head 24 which is provided with a plurality of corrugations 26, forming axially extending, peripherally spaced teeth. The teeth 26 are of such size that the enlargement 28 is inserted in the opening 20 and the teeth cut into the margin of the mounting plate 16 forming the central opening. The bearing member 26 is also provided with a reduced diameter portion 30 which is exteriorly threaded at its outer end. A washer 32, preferably of metal, surrounds the head 24 in abutment with the surface of the mounting plate 16. The control device 14 is mounted on the panel 12 by means of inserting the reduced portion 30 of the bearing member 22 through an opening 34 in the panel. A lock washer 36 is threaded on the end of the reduced portion 30 which secures the shoulder 28 on the head 24 in engagement with the panel 12.

Secured to the mounting plate 16 is a flat resistance element 38. The resistance element 38 is in general an annulus, but is interrupted at 40, breaking what would otherwise be a continuous ring. The ring 38 is a carbon coated resistance element and forms one of the electrical contacts of the control device 14. One end of the strip 38 is provided with a radially extending projection 41 which overlies the fan tail portion 18 at one side thereof and to which it is secured by means of a rivet 42. The other end of the resistance strip is provided with a radially extending portion 44 which overlies the fan tail portion 18 at the other side thereof and is secured to the latter by means of a rivet 46, the latter also securing a contact terminal 48.

The left of the mounting plate 16 will be termed, for convenience, the interior of the control device 14 which will be hereinafter referred to in detail, but reference is made to the feature at this time to aid in the description of the appliance.

A fiber washer 50 abuts against the resistance element 38 on the inner side thereof. The washer 50 is of considerably lesser diameter than the resistance element 38, whereby the greater portion of the resistance element is exposed. The manner of retaining the washer 50 in position will be referred to later.

Inwardly of the washer 50 and abutting against its inner flat surface is a ring shaped contact element 52 having a radial arm 54 extending radially beyond the fan tail portion 18. The arm 54 is provided with a bent portion 56 in the form of a depression which extends through an opening 58 in the mounting plate 16. Radially outwardly of the depression 56, the arm 54 is bent at 60, fitting into a notch 62 in the radially outer periphery of the fan tail portion 18. The terminal portion of the arm 54 then extends radially outwardly an extent similarly to the contact terminal 48, and forms a contact terminal. The contact terminal 48 and the outer extremity of the arm 54 are adapted to have electric wires 62 soldered thereto as at 64. The contact terminal 48 and the outer end of the arm 54 thus form the terminals for the control device 14.

The control shaft, forming the subject matter of the present invention, is indicated generally at 66 and is shown by itself, in perspective, in Figure 6. The control shaft 66 is a unitary molded plastic of high electrical insulation characteristics. I prefer to mold the device 66 of "nylon" because of its high electrical insulation characteristics and the fact that it forms good bearing material, as well as being stronger than most other plastics.

The control shaft 66 includes a shaft element 68. The shaft element is preferably provided with a screw driver kerf 70 in one end, although the kerf is not essential and may be omitted; the shaft element may be formed so as to receive a knob. Adjacent the opposite end is an integral disc 72 disposed transverse to the axis of the shaft element 68, and as viewed in Figures 1 and 6 is of considerable axial thickness. The disc 72 is generally of circular shape except that at one side it is cut off flat as indicated at 74.

The numeral 76 indicates cut out areas in the periphery of the disc 72, forming portions 78 of lesser thickness of the main body of the disc 72. The radially outer edges of the portions 78 are provided with notches 80.

A boss 82 is molded integral with the remainder of the device and extends from the disc 72 in the direction therefrom opposite the shaft element 68 and is in axial alignment therewith. The boss 82 thus forms in effect an extension of the shaft element 68. A hole or bore 84 is formed in the shaft element, extending axially through the boss, through the disc, and into a substantial portion of the length of the shaft element 68.

Integral strengthening ribs 86 are formed on the outer face of the disc 72, on the same side thereof as the boss 82. The ribs extend from the boss 82 radially outwardly to positions adjacent the periphery of the disc 72.

The disc 72 is also provided with an integral lug 88 positioned adjacent the periphery of the disc and extending axially therefrom in the same direction as the boss 88. The lug 88 extends slightly radially beyond the disc 72 as indicated at 90.

Mounted on the disc 72 is a metal spring contact member indicated generally at 92 and includes parallel tangential side portions 94 which are provided with crimping lugs 96 at their lateral edges. The spring contact member 92 also includes spring fingers 98 extending inwardly toward each other from the side portions 94, having convex contacting areas 100 on their extremities. The spring fingers 98 are sprung outwardly from the plane of the main portion of the spring contact 92 or toward the reader as observed in Figure 4, and to the right as observed in Figure 1 for a purpose which will be explained in the assembly of the device. The spring contact 92 also includes an arcuate portion 102 which connects the side portions 94 and spring fingers 104 which are also arcuate in shape, and disposed axially outwardly of the arcuate portion 102. The spring fingers 104 are provided with cut out areas in their extremities forming relatively offset portions 106 which extend circumferentially beyond one another. The portions 106 are also sprung outwardly from the plane of the main portion of the spring contact 92 in the same direction as are the spring fingers 98.

The spring contact 92 is applied to the surface of the disc 72 on the side thereof from which the shaft 68 extends and the crimping lugs 96 are fitted in the notches 80 and crimped over and toward each other to the positions illustrated in Figure 3, wherein the lugs fit down flat over the thin portion 78 and the spring contact is then secured to the disc 72.

The control shaft 66 with the spring contact 92 thus secured thereto is assembled in the switch or appliance by inserting the shaft through the tubular bearing member 22 from the left of Figure 1, or from the inside of the control device 14. The spring contact 92 is so positioned that the spring fingers 98 are biased into engagement with the ring 52 which forms a terminal member in the switch.

The reference numeral 108 indicates a cap for the switch or appliance and includes a surrounding wall 110 and outer wall 112. The surrounding wall 110 is provided with a plurality of normally axially extending crimping lugs 114. The diameter of the cap 108 is similar to the diameter of the main portion of the mounting plate 16, the latter being provided with a plurality of notches 116 in its periphery, and the lugs 114 are inserted in the notches 116 and crimped over the mounting plate. The outer wall 112 is thus spaced from the mounting plate 16 and the cap, together with the mounting plate 16, form a housing for the control device. A portion of the outer wall 112 and surrounding wall 110 is severed, and bent inwardly as indicated at 118, forming a stop which is adapted to be engaged by the lug 88 on the disc 72.

With the assembly as described, the outer wall 112 engages the boss 82 and retains the device 66 in position. The spring fingers 98 come into engagement with the contact member 52 and the spring fingers 106, being spaced radially outwardly beyond the spring fingers 98, come into contact with the annular resistance element 38. All of the spring fingers tend to bias the disc 72, and therefore the whole control device 66, to the left (Figure 1) or toward the outer wall 112, and the outer wall 112 thus acts as a stop or retention means for retaining the spring contact fingers in constant engagement with the respective contact terminals 38 and 52.

The shaft element 68 is of course rotatably mounted in the bearing member 22 and the whole assembly is mounted in the panel 12 which forms a part of the cabinet or set in such a manner that the control device 14 is disposed inside of the cabinet and the shaft element 68 extends outside of the cabinet in position for a repairman to make adjustments thereon. The repairman inserts a screw driver in the kerf 70 and thereby is enabled to rotate the shaft 68 and make appropriate adjustments. Upon rotation of the shaft element 68 the spring contact fingers 98 and 106 are moved to respective positions on the contacts 38 and 52 for controlling the current flowing therethrough. It will be observed that the control device 14 herein illustrated is in the nature of a rheostat. When the spring fingers 106 are spaced a considerable distance from the terminal 48 (i. e. around the ring 38 toward the projection 41) greater resistance is placed in the circuit and as it is moved toward the terminal 48, the current flowing through the device is progressively greater. It will be understood that while an appliance such as a rheostat is illustrated, the control shaft of the present invention can be used equally well in what is commonly known as a switch. The amount of rotation of the shaft element 68 is limited in each direction by means of the lug 88 engaging the stop 118 of the cap 108, on one side or the other. The washer 50 and the ring 52 are held in position as illustrated in Figure 1 by means of the spring contact fingers 98 engaging the contact 52, and the control shaft is held in position by the cap 108. Preferably the surrounding wall 110 is provided with an insulation lining 118 which may be a fiber material, or plastic or other desired electrical insulation material.

From the above description it will be obvious that many advantages are provided by the present invention. Formerly the shaft element, such as 68, was formed of metal which of course is of high electrical conductivity. In certain installations such as television sets there are lines of high voltage and the repairman is in danger of severe shock and injury unless extreme care is taken. In order to overcome the danger, the shaft element such as 68, when formerly made of metal had necessarily associated therewith suitable electrical insulation material. Such a construction is rather costly and was not as effective in insulating against the high voltage as was desired. In the present instance, the shaft element 68 is formed of a molded plastic electrical insulation material, and therefore a repairman can with complete safety grasp the shaft without any fear or danger of shock or injury. There are no exposed parts of the control device 14, and there is no means whereby current can be conducted outwardly through the shaft element 68.

Another advantage of the present invention resides in the fact that the boss 82 can be molded integral with the whole device 66. Previously and in the case when a shaft element such as 68, is of metal, it is necessary to form a disc such as 72, or at least a part of it, of insulation material, which necessitated complicated and expensive constructions. Moreover when such a disc was secured to the shaft it was not feasible, or at least it was exceedingly costly, to secure a boss such as 82 in the position as indicated in the drawing. In view of such difficulty, it was necessary, in order to retain the spring fingers 98 and 106 in engagement with the appropriate contacts to secure a washer around the shaft 68 in abutment with the reduced end 30 of the bearing member 22. Such a means ordinarily comprises a circumferential groove in the shaft and a C-washer in the groove. Such a costly arrangement has been dispensed with in the present instance.

The control shaft 66, in the present instance, can be formed by mass production methods and at a cost considerably less than devices of the same general nature heretofore known and insure proper safety in making of adjustments.

While I have herein shown and described a preferred form of my invention, manifestly it is susceptible of modification and rearrangement of the parts without departing from the spirit and scope thereof. I do not, therefore, wish to be understood as limiting my invention to the precise form herein disclosed, except as I may be so limited by the appended claims.

I claim as my invention:

1. A control shaft formed as a unitary article, and formed of electrical insulation material, comprising, a shaft element adapted for rotatable mounting, one end of said shaft element having a radial kerf at one end, a transverse disc integral with and adjacent the other end of said shaft element, said disc having cut-out areas adjacent its periphery forming portions of lesser axial thickness than the main portion of said disc, said portions having notches in their radially outer edges, an integral boss on the side of said disc opposite said shaft element, said boss being in axial alignment with and forming an extension of said shaft element, integral radial ribs on said disc on the side thereof adjacent said boss and extending from said boss to positions adjacent the periphery of the disc, and an integral lug on said disc adjacent the periphery thereof and extending in the same direction as said boss and having a lesser axial extent than said boss.

2. A control shaft formed as a unitary article, and formed of electrical insulation material, comprising, a shaft element adapted for rotatable mounting, one end of said shaft element having a radial kerf at one end, a transverse disc integral with and adjacent the other end of said shaft element, said disc having cut-out areas adjacent its periphery forming portions of lesser axial thickness than the main portion of said disc, said portions having notches in their radially outer edges, integral radial ribs on said disc on the side thereof opposite said shaft element and extending from adjacent the center of the disc to positions adjacent the periphery of the disc, and an integral lug on said disc adjacent the periphery thereof and extending axially therefrom in the direction opposite said shaft element and having a greater axial dimension than said ribs.

ARNOLD P. HULTGREN.

REFERENCES CITED

The following references are of record in the file of this patent:

UNITED STATES PATENTS

| Number | Name | Date |
|---|---|---|
| 1,934,228 | Hill | Nov. 7, 1933 |
| 2,406,503 | Miller | Aug. 27, 1946 |
| 2,484,667 | Arisman et al. | Oct. 22, 1949 |

OTHER REFERENCES

Foote, "Plastics," pages 21, 22 and 82, March 1947.